Dec. 27, 1949  R. G. COX ET AL  2,492,271
FLAPPER VALVE
Filed Oct. 11, 1946  2 Sheets-Sheet 1
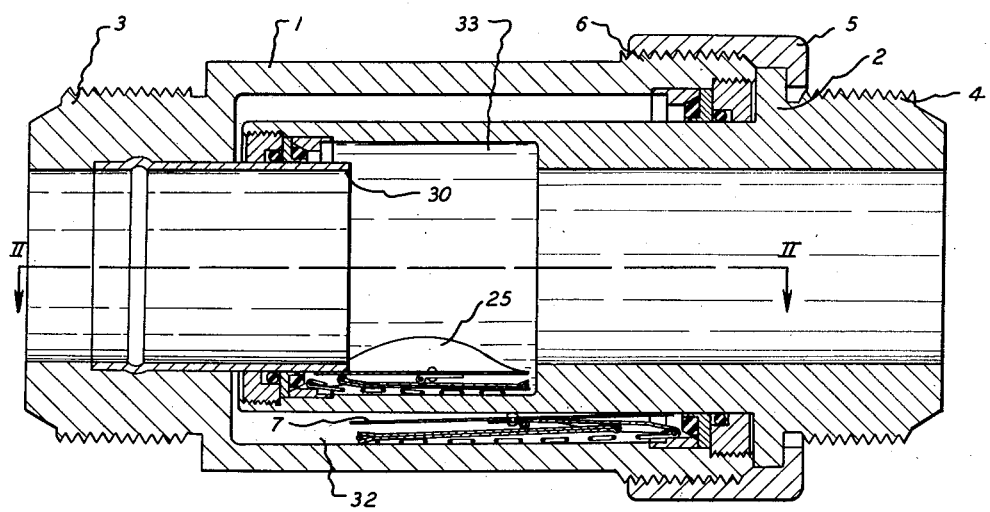
FIG. I.
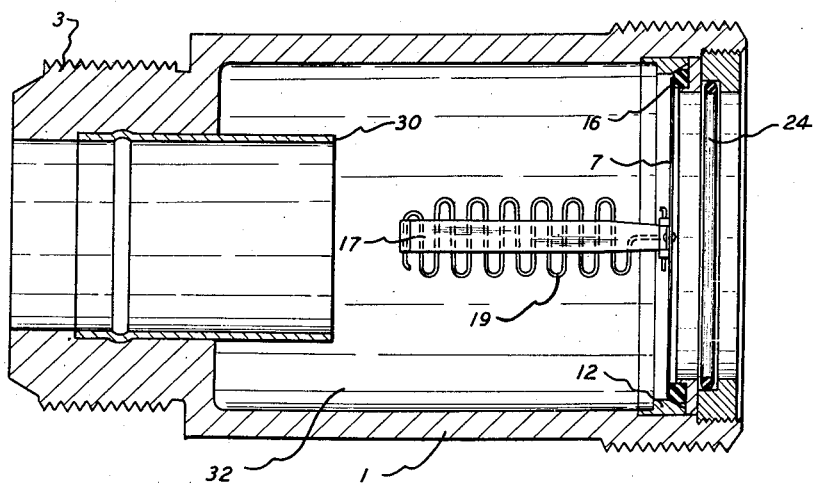
FIG. II.
Inventors
ROBERT G. COX and
DONALD W. MAIN
By Beaman & Patch
Attorneys Dec. 27, 1949  R. G. COX ET AL  2,492,271
FLAPPER VALVE
Filed Oct. 11, 1946  2 Sheets-Sheet 2
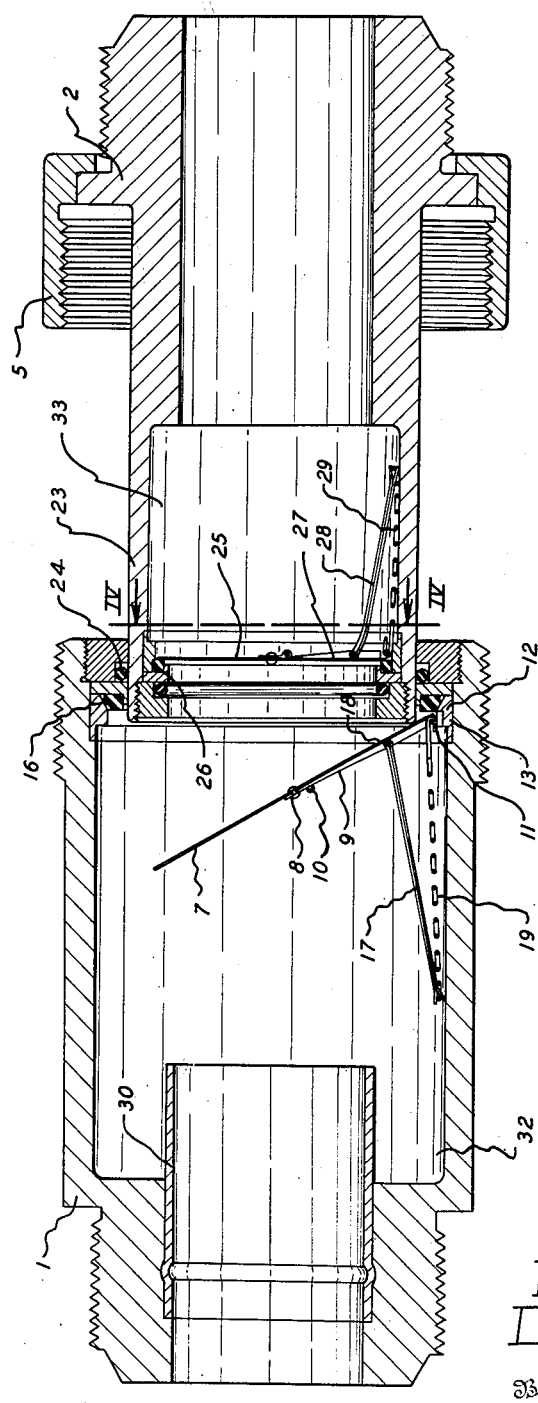
FIG. III.
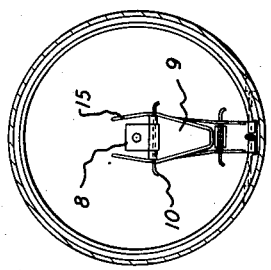
FIG. IV.
Robert G. Cox and
Donald W. Main  Inventors
By Bassan + Patch
Attorneys Patented Dec. 27, 1949

2,492,271

UNITED STATES PATENT OFFICE 2,492,271

FLAPPER VALVE

Robert G. Cox and Donald W. Main, Jackson, Mich., assignors to Aeroquip Corporation, Jackson, Mich., a corporation of Michigan Application October 11, 1946, Serial No. 702,608

9 Claims. (Cl. 284—18)

1

The present invention relates to fluid conducting couplings, and more particularly to self-sealing couplings.

In the art there are a number of designs of self-sealing couplings, but they are characterized by expense of manufacture and by lack of simplicity of design. The coupling according to the present invention has a valve associated with each portion thereof, for sealing each portion against the escape of fluid when the coupling is opened. The coupling arrangement, together with the associated valve structure, is effective, simple of design, and cheap to manufacture.

An object of the present invention is to provide a self-sealing coupling.

Another object of the invention is to provide a self-sealing coupling having a valve in each portion thereof, each valve having a seat defining the central opening and a disc-like valve member swingable into engagement with the seat.

Another object of the invention is to provide a swingable valve member of the character described, which is of resilient, sheet, spring material.

Another object of the invention is to provide a swingable valve of the character described arranged for pivotal movement from one side of the seat.

Another object of the invention is to provide a resiliently biased, swingable disc valve member adapted to be opened by exerting pressure against the surface thereof in a direction opposite the closing direction.

Still another object of the invention is to provide a valve of the character described having associated therewith an annular chamber in which the valve is disposed while open.

A further object of the invention is to provide a coupling of the character described wherein one coupling portion is provided with a swingable valve member resiliently biased outwardly into closing position and movable inwardly into open position by a portion of the other coupling member.

A still further object of the invention is to provide a coupling, each portion of which is provided with a valve of the character described.

These and other objects will be apparent from the arrangement, and combination and construction of the parts when taken with the accompanying drawing, in which:

Fig. I is a vertical section through a coupling according to the present invention with the parts

2 thereof in coupled engagement, with the valves of both coupling portions in open position, Fig. II is a partial section on the line II—II of Fig. I showing one coupling portion with the valve in closed position, Fig. III is a vertical section of a coupling according to the present invention corresponding to the showing of Fig. I, but with the coupling portions in such relationship with respect to each other that the valve in one coupling portion is closed and in the other coupling portion is partly open, and Fig. IV is a section of the line IV—IV of Fig. III, showing a detail of the valve actuator structure.

Referring particularly to the drawings, reference character 1 indicates a first coupling member and reference character 2 indicates a second coupling member. The coupling members 1 and 2 have threaded portions 3 and 4 for securing them respectively in a fluid conducting line. The coupling member 2 is provided with an internally threaded nut 5 for coacting with a male connecting portion 6 for holding coupling members 1 and 2 together when in closed relation.

For a more complete understanding of the invention reference is made to Fig. III. The coupling member 1 is provided with a valve member 7. Valve member 7 preferably is of spring steel and disc-like in form. It has riveted to it a bracket 8 to which is pivoted an actuator 9 by a pin 10. The actuator 9 is pivoted by a pin 11 to a ring 12 which is disposed in an annular recess 13 in the coupling member 1. A hairpin spring 15 is arranged under a pin 10 and bears against both the valve member 7 and the actuator 9 to resiliently hold the actuator 9 in substantially parallel relation with the valve member 7.

The valve member 7, without structure additional to that already described, would be free to swing back and forth on the pin 11. Adjacent the pin 11 and suitably mounted, as for example in the ring 12, is a valve seat 16. The seat 16 may be of any suitable material, but preferably is of synthetic rubber and is so related to the various positions which the valve member 7 may take when swinging about the pivot 11 as to seat firmly with respect to the valve member 7, when the valve member 7 is normal to the longitudinal axis of the coupling member 1.

The valve member 7 is resiliently biased against the seat 16 by a link 17 pivoted 18 to the actuator 9 intermediate its ends, and by a tension spring 19, shown particularly in Fig. II, anchored at the outer end of the link 17 and to a fixed point which in the embodiment illustrated of the invention is the pin 13. Thus the spring 19 being under contracting stress exerts a longitudinal force on the link 17 to move the actuator 9 which in turn moves the valve member 7 against its seat 16 to close the coupling member 1 against the outward flow of fluid therefrom.

The coupling member 2 is provided with a tubular portion 23 which is arranged to be telescopically received by the coupling member 1. A seal is provided between the coupling member 1 and the tubular portion 23 of the coupling member 2 by a sealing ring 24. The sealing ring 24, preferably is of synthetic rubber and of the O type, being disposed in a suitable radially inwardly facing groove. It will be observed from Fig. III that as the coupling members 1 and 2 telescope together, the tubular portion 23 bears against the valve member 7 forcing the same open against the action of the spring 19 and link 17. One of the particular features of the present invention is that as the valve member 7 is of resilient, sheet, spring material, it may yield from a plane form and assume a curved form, as shown particularly in Fig. I, so as to permit the tubular member 23 to move by the same, while at the same time still having the actuator 9 pivoted close to the path of movement of the tubular member 23. This arrangement permits a smaller and more compact coupling than would otherwise be obtainable with the type of valve structure disclosed.

The coupling member 2 has disposed within the tubular portion 23 a valve structure identical with that disclosed as being disposed in the coupling member 1, except that it is constructed on a smaller scale. While all of the details of the valve structure in Fig. II are the same, it will suffice to point out that there is a valve member 25 coacting with a valve seat 26, and an actuator 27 in turn resiliently biased by a link 28 and a spring 29.

As pointed out above, the valve 7 is opened by the tubular member 23 bearing thereagainst during telescopic movement of the coupling members 1 and 2. The valve 25 is opened by a tubular member 30 secured in the coupling member 1 engageable with the valve member 25 in the same manner that the tubular portion 23 is engageable with the valve member 7. It will be observed that the spacing of the tubular member 30 and the pivot pin 11 of the valve 7 is such that the valve 7 may swing down into substantial parallelism with the spring 19 under the action of the tubular portion 23 without any interference occurring between the valve member 7 and the tubular portion 30. Then as the coupling members 1 and 2 telescope more together, after the valve 7 is fully open, the tubular portion 30 engages with the valve member 25 to open the same and to move it in substantial parallelism with the spring 29.

The completely coupled relative positions of the coupling members 1 and 2 is disclosed in Figs. I and II. The coupling member 1 is provided with an annular chamber 32 and the coupling member 2 is provided with an annular chamber 33. It will be observed by reference to Fig. I that the valves 7 and 25 respectively are disposed within the annular chambers 32 and 33 when the coupling is closed so as to provide an unobstructed passage for fluid through the couplings. It will be observed further that the valve member 25, as shown particularly in Fig. I, assumes a curved position in the annular chamber 33 so as to prevent interference between it and the tubular portion 30.

It will be apparent from the foregoing disclosure that the valve members 7 and 25 are disclosed as being in the coupling members 1 and 2 respectively. It will be apparent, of course, that only one of the coupling members need have such a valve member if it is desired to maintain fluid in only the high pressure side of a line in which the coupling is connected. Likewise it will be evident, as appears in Fig. III, that the valve member 7 may be opened before the valve member 25 is opened, so that if the coupling member 1 is the high pressure side of the line, the fluid pressure within the line will open the valve member 25, the latter serving as a spring biased check valve. In such an arrangement structure such as the tubular member 30 would not be required to open the valve 25. While we have shown specific valve details as incorporating one embodiment of the invention, it will be apparent that the invention may take other forms. Accordingly, we do not wish to be limited except by the scope of the following claims.

Having thus described our invention, what we desire to cover by Letters Patent and claim is:

1. In a coupling of the character described, a pair of valve units, each unit housing a seat defining a central opening, a valve member for and adapted to bear against each seat in sealing relation, means to resiliently bias each valve member against its seat, said coupling housing a pair of tubular coupling members, one of said valve units being disposed in each of said coupling members to seal the same against outward flow of fluid therefrom, one of said coupling members being telescoped within the other, whereby during telescoping movement the valve member in the receiving coupling member is forced open against the action of its biasing means by the received coupling member, and a tubular nose within said receiving coupling member spaced inwardly thereof from its valve seat, for bearing on the valve of the received coupling member during advanced stages of the telescoping movement, after the other valve is opened by received member, to open the said valve of the received coupling member.

2. A valve of the character described comprising a hollow body part having a continuously curved interior bore surface, a peripheral valve seat on said body part, a valve member adapted to engage said seat to close said body part, said valve member being formed from inherently resilient material and having its peripheral profile corresponding in shape to that of the said continuously curved bore surface, an actuator for said valve member, pivoted to said valve member, means mounting said actuator for pivotal movement, whereby upon pivotal movement of said actuator said valve member is moved into its closed position upon said seat or is moved back into the body part where the resilient valve member deforms itself to the shape of the said bore surface so as to lie flat thereagainst, and means to move said actuator to engage said valve member with said seat.

3. A valve of the character described comprising a hollow body part having a continuously curved interior bore surface, a peripheral valve seat on said body part, a valve member adapted to engage said seat to close said body part, said valve member being formed from inherently resilient material and having its peripheral profile corresponding in shape to that of the said continuously curved bore surface, an actuator for said valve member, pivoted to said valve member, means mounting said actuator for pivotal movement, whereby upon pivotal movement of said actuator said valve member is moved into its closed position upon said seat or is moved back into the body part where the resilient valve member deforms itself to the shape of the said bore surface so as to lie flat thereagainst, and resilient means to pivot said actuator to move said valve member into closing relation with said seat, said resilient means being yieldable upon the application of pressure against said valve member in an opening direction of the latter into the hollow body part.

4. A valve of the character described comprising a hollow body part having a continuously curved interior bore surface, a peripheral valve seat on said body part, a valve member adapted to engage said seat to close said body part, said valve member being formed from inherently resilient material and having its peripheral profile corresponding in shape to that of the said continuously curved bore surface, an actuator for said valve member, pivoted to said valve member, means mounting said actuator for pivotal movement, whereby upon pivotal movement of said actuator said valve member is moved into its closed position upon said seat or is moved back into the body part where the resilient valve member deforms itself to the shape of the said bore surface so as to lie flat thereagainst, a link pivoted at one end to said actuator, and means to exert a yieldable force against the other end of said link to pivot said actuator to move said valve member into closing relation with said seat.

5. A valve of the character described comprising a hollow body part having a continuously curved interior bore surface, a peripheral valve seat on said body part, a valve member adapted to engage said seat to close said body part, said valve member being formed from inherently resilient material and having its peripheral profile corresponding in shape to that of the said continuously curved bore surface, an actuator for said valve member, pivoted to said valve member, means mounting said actuator for pivotal movement, whereby upon pivotal movement of said actuator said valve member is moved into its closed position upon said seat or is moved back into the body part where the resilient valve member deforms itself to the shape of the said bore surface so as to lie flat thereagainst, a link pivoted at one end of said actuator, and a tension spring anchored at one end to the other end of said link and to such a fixed position as to exert a component of force axially of said link to pivot said actuator to move the said valve into closing relation with said seat.

6. A valve of the character described comprising a hollow body part having a continuously curved interior bore surface, a peripheral valve seat on said body part, a valve member adapted to engage said seat to close said body part, said valve member being formed from inherently resilient material and having its peripheral profile corresponding in shape to that of the said continuously curved bore surface, an actuator for said valve member, pivoted to said valve member, means mounting said actuator for pivotal movement, whereby upon pivotal movement of said actuator said valve member is moved into its closed position upon said seat or is moved back into the body part where the resilient valve member deforms itself to the shape of the said bore surface so as to lie flat thereagainst, said actuator pivot means being connected at a point to one side of said peripheral seat, a link pivoted at one end to said actuator, and means to exert a yieldable force against the other end of said link to pivot said actuator to move said valve member into closing relation with said seat.

7. A valve of the character described comprising a hollow body part having a continuously curved interior bore surface, a peripheral valve seat on said body part, a valve member adapted to engage said seat to close said body part, said valve member being formed from inherently resilient material and having its peripheral profile corresponding in shape to that of the said continuously curved bore surface, and actuator for said valve member, pivoted to said valve member, means mounting said actuator for pivotal movement, whereby upon pivotal movement of said actuator said valve member is moved into its closed position upon said seat or is moved back into the body part where the resilient valve member deforms itself to the shape of the said bore surface so as to lie flat thereagainst, said actuator being pivoted at one end to a fixed point at one side of said seat and at the other end to said valve member, a link pivoted at one end to said actuator between the ends thereof, and a tension spring anchored at the other end of said link and to a fixed position so as to exert a component force axially of said link to pivot said actuator to move said valve into closed relation with said seat.

8. A valve of the character described comprising a hollow body part having a cylindrical bore, an annular valve seat on said body part, a disc-shape valve member adapted for engagement with said seat to close the body part, said valve member being made from resilient sheet spring material, means pivotally mounting said valve member upon the body part for movement into the closed position against said seat or back into the said cylindrical bore, said valve member being capable of deforming itself to the shape of the cylindrical bore surface as it is moved against the latter in the valve opening movement, an actuating arm for said valve member pivoted to the latter at one end and to a point at one side of said seat at the other end, a link pivoted at one end to said actuator between the ends thereof, and means adapted to exert a yieldable force against the other end of said link to pivot said actuator to move said valve member into closed relation with said seat.

9. In a self-sealing coupling, a pair of tubular body parts, means adapted releasably to connect said body parts together, said body parts having portions which telescope with respect to one another when the body parts are connected, an annular valve seat defined around the interior of each body part, a disc valve for each said valve seat, means pivotally mounting said valves on the respective body parts, said valves being of inherently flexible sheet material, and resilient means associated with each valve to urge the valve to its seat when the body parts are disconnected, said valves being deformable to lie flat against the interior of their body parts by the telescoping of said portions, whereby to provide a free full bore flow through the connected parts.

ROBERT G. COX.
DONALD W. MAIN.

(References on following page)

REFERENCES CITED

The following references are of record in the file of this patent:

UNITED STATES PATENTS

| Number | Name | Date |
|---|---|---|
| 252,958 | McDonnell | Jan. 31, 1882 |
| 374,766 | Wanner | Dec. 13, 1887 |
| 599,603 | Froelich | Feb. 22, 1898 |
| 673,674 | Baker | May 7, 1901 |
| 1,788,596 | Russell | Jan. 13, 1931 |
| 1,800,045 | Bates | Apr. 7, 1931 |
| 1,885,523 | Kosanovich | Nov. 1, 1932 |
| 2,301,859 | Danster | Nov. 10, 1942 |

FOREIGN PATENTS

| Number | Country | Date |
|---|---|---|
| 1,871 | Netherlands | Aug. 25, 1913 |